United States Patent [19]

Janosky

[11] 3,975,662

[45] Aug. 17, 1976

[54] OFF-CENTER RADAR DISPLAY CIRCUIT

[75] Inventor: Milton J. Janosky, Nashua, N.H.

[73] Assignee: Sanders Associates, Inc., Nashua, N.H.

[22] Filed: Feb. 10, 1975

[21] Appl. No.: 548,502

[52] U.S. Cl. .............................. 315/378; 315/398
[51] Int. Cl.² ........................................ H01J 29/78
[58] Field of Search .............. 315/378, 398; 343/10, 343/11

[56] References Cited
UNITED STATES PATENTS

| | | | |
|---|---|---|---|
| 2,717,330 | 9/1955 | Meagher et al. | 315/378 |
| 2,720,645 | 10/1955 | Sherwin | 315/378 |
| 2,768,323 | 10/1956 | Schonover | 315/378 |
| 2,950,475 | 8/1960 | Hance | 315/378 |

Primary Examiner—Maynard R. Wilbur
Assistant Examiner—T. M. Blum
Attorney, Agent, or Firm—Louis Etlinger; Joseph E. Funk

[57] ABSTRACT

In a radar PPI display, digital techniques are utilized to allow an operator to move the point about which the radial trace beam rotates to a point remote from the center of the radar viewing screen and including movement off the screen without actually moving the display beam off the screen. A sweep signal generator detects the location of the operator positioned off-center point from the settings of off-center controls and is responsive to radar range scale and antenna position signals to generate appropriate ramp deflection signals in the proper time sequence to accurately display a selected portion of the plan position indication upon the entire area of the viewing screen. A beam control circuit is responsive to the same signals as the signal generator and to a radar start pulse to determine the exact time the PPI display beam is to be turned on to display selected portions of the plan position indication. In this manner, the display beam is never deflected off the screen but is selectively blanked and unblanked and swept across the viewing screen to display the selected portion of the plan position indication upon the viewing screen as if the radar trace originated off the screen. The signal generator and control circuit cooperate such that when a target under study is in the middle of the screen when range scale is changed, the target will still be in the middle of the screen except that it will be expanded or contracted according to the range scale change.

9 Claims, 17 Drawing Figures

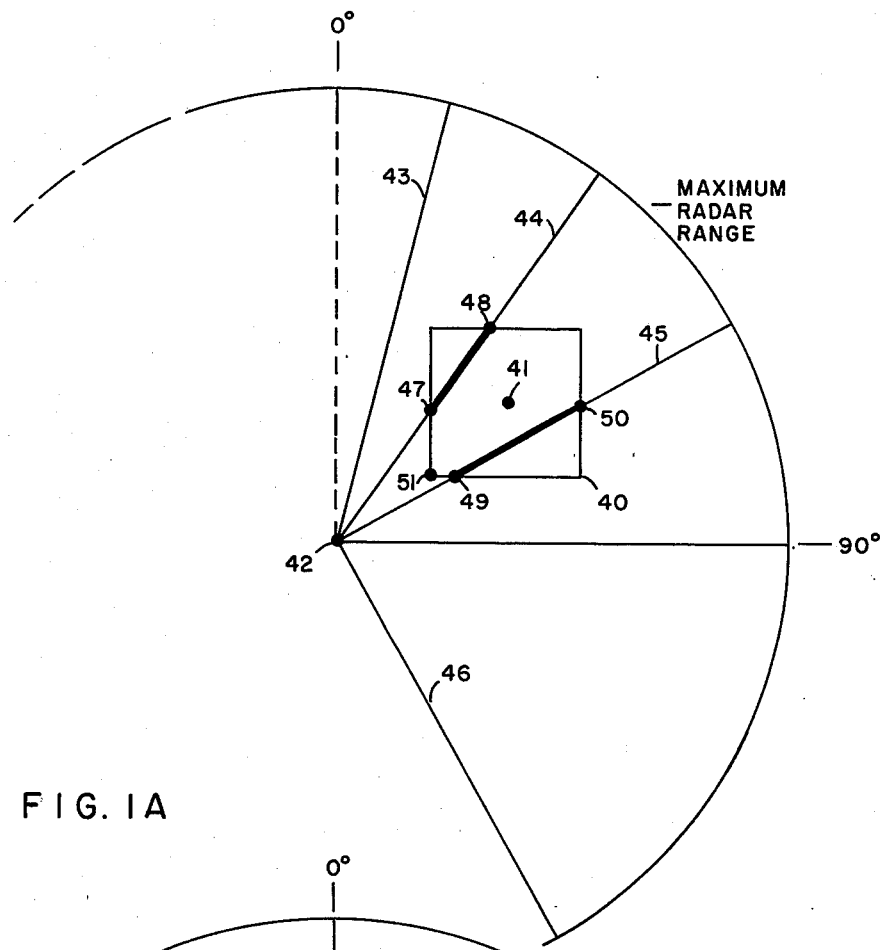
FIG. IA
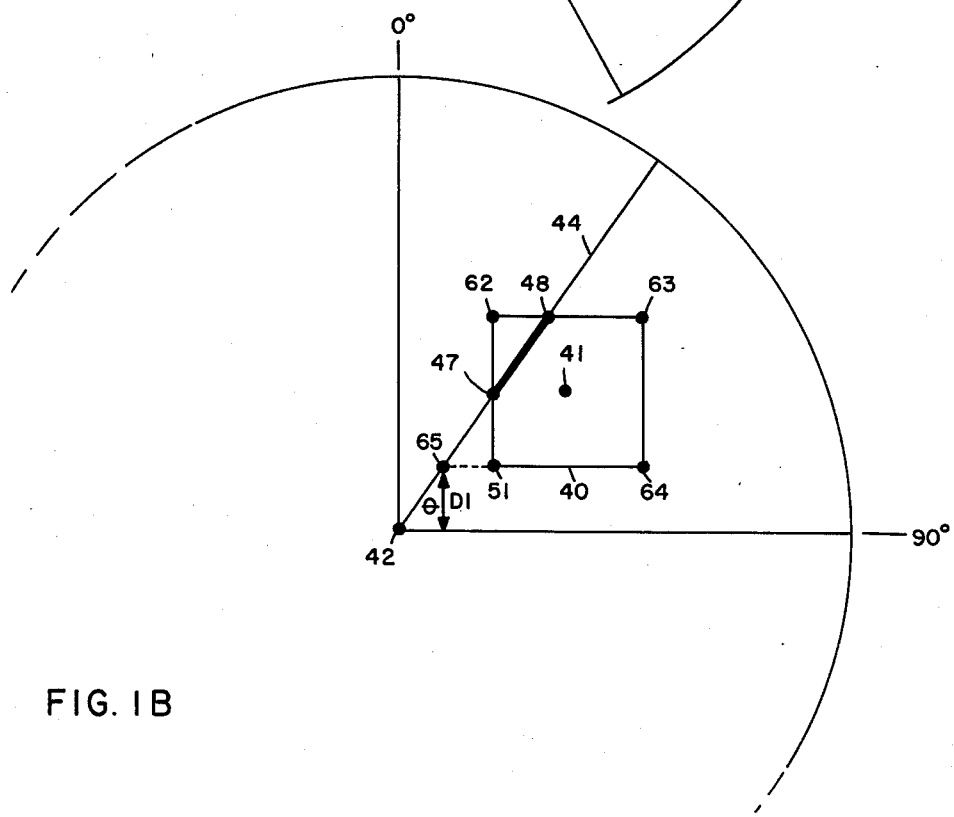
FIG. IB

OFF-CENTER RADAR DISPLAY CIRCUIT

This invention relates to indicating devices and more particularly to equipment for off-center operation of display devices displaying directionally received information.

In conventional radial scan radar systems a radial trace on the radar display indicating screen is rotated in synchronism with the rotation of an antenna. The origin of the radial trace is generally in the center of the indicating screen and radar targets in an area extending 360° about the radar antenna are displayed on the screen with their range indicated by the radial distance of the target from the trace origin at the center of the screen. The azimuth of radar targets displayed on the screen is derived by their angular displacement with respect to a reference direction also indicated on the screen.

The prior art teaches off-center operation of radar displays wherein the radial trace origin is moveable to a position remote from the center of the screen. To accomplish this the radar operator utilizes off-center controls which move the trace origin to another point on or off the screen. In the prior art sweep signals and off-set signals are generated by analog circuitry which, when amplified, amplify inherent distortions, off-sets and nonlinearities associated with sweep generator deflection signals. As a result of the cumulative effects of these errors, off-sets greater than two (2) times the display screen radius are generally not practical.

By utilizing off-center operation and properly selecting radar range controls an operator may effectively "blow-up" a selected portion of a radar display and fill the entire screen with it. Upon changing the range control to a shorter range, however, the targets to be observed are often moved off the screen and the off-center controls must be manipulated until the target is moved back onto the screen. This is a troublesome, tedious task and observation time of the target is lost with perhaps dangerous operational consequences.

SUMMARY OF THE INVENTION

To solve the aforementioned problems in the prior art I provide digital apparatus for off-center operation of a radar system that does not drive the displaay beam beyond the edge of the screen thereby minimizing positional display errors due to amplification of nonlinear analog deflection signals. With my novel linear digital equipment the display beam is positioned at one edge of the indicator display and blanked during the calculated time the beam could be considered as traveling from an off-screen, off-center trace origin to the screen. The beam is then moved to a specific calculated point along the edge of the screen, is unblanked and moved across the screen to another edge thereof where it again is blanked.

More particularly, my novel apparatus includes a circuit that is responsive to off-center control signals, antenna position signals, and range scale signals to determine the location of the off-center trace origin and then computes the time for the display trace to travel from the off-center origin to the indicating screen, if the beam could do so, and then the display beam is unblanked and allowed to display only that portion of the trace that can appear on the indicating screen. Another circuit of my novel apparatus is responsive to the same radar system signals, a radar start pulse (or trigger) and to the calculations made by my first circuit to generate horizontal and vertical ramp deflection signals which are applied to the display CRT at the appropriate time to display the portion of the trace. In this manner the ramp deflection signals are used to position the blanked display beam at a selected point along the edge of the indicating screen and then deflect the unblanked beam across the screen.

Further, it is a feature of my novel off-center apparatus that a radar operator need only center a target or area of interest in the middle of the display screen utilizing the off-center controls and then may operate the range control without losing the target or area and having to relocate same. As the range control is operated the target of interest remains in the middle of the screen and is either expanded for a shorter range setting or is contracted for a longer range setting.

My invention and its various advantages and features will appear more fully upon consideration of the attached drawings and the following detailed description thereof.

In the drawings:

FIGS. 1A and 1B show a representation of a radar display screen functioning in an off-center mode of operation;

Figure 5:
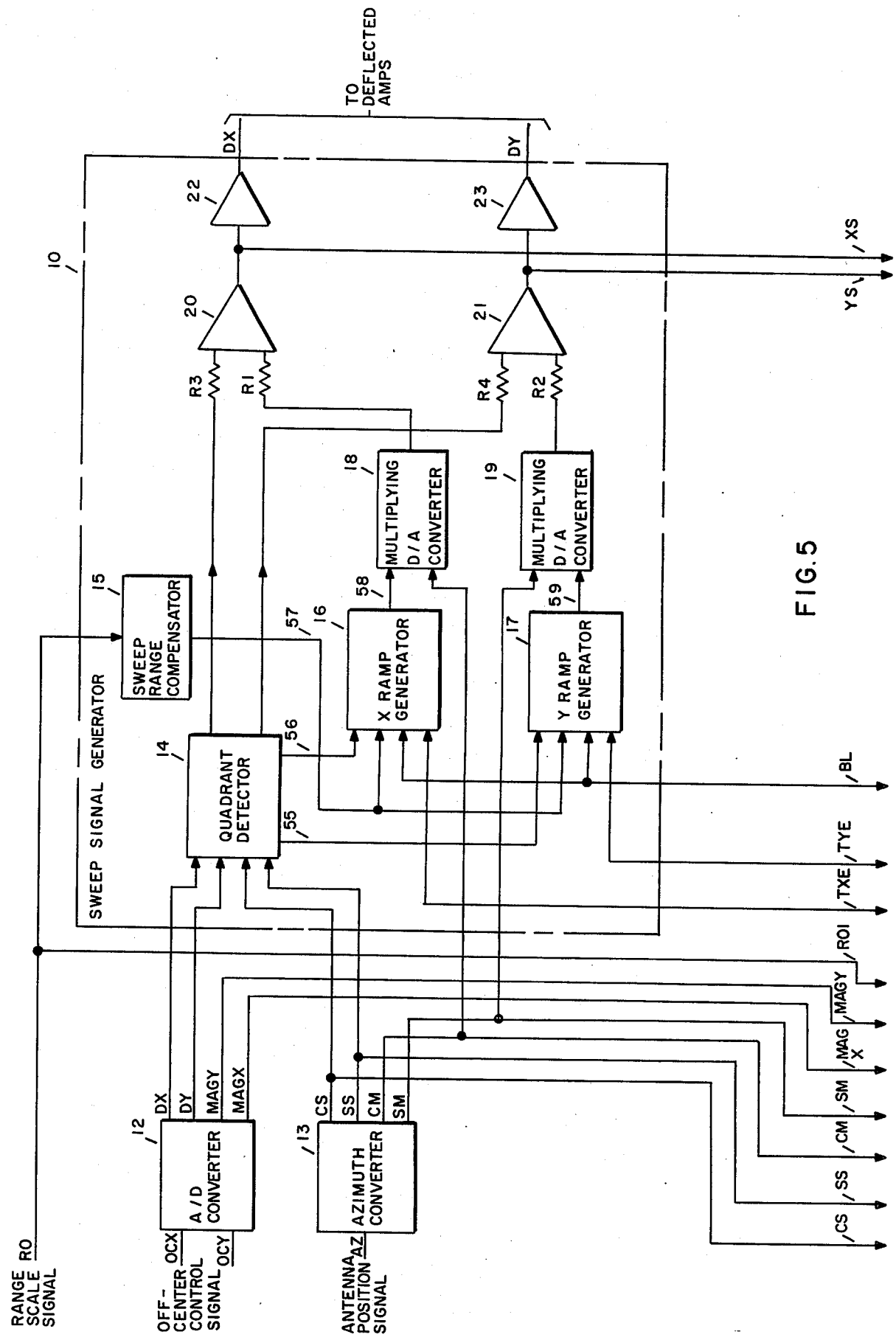
Figure 6:
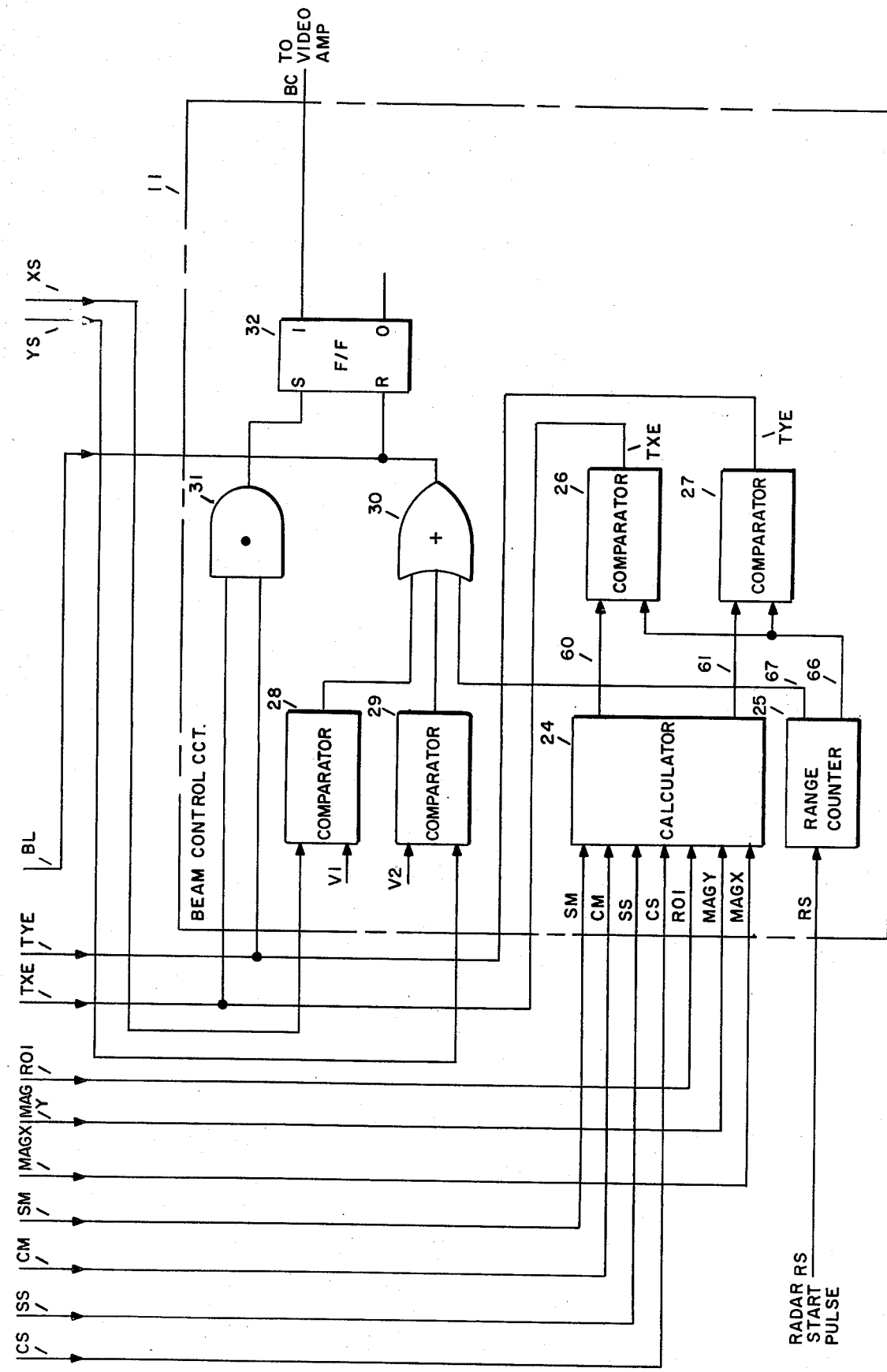

FIGS. 5 and 6, when arranged in the manner shown in FIG. 7, show a detailed block diagram of my radar off-center circuit in accordance with the preferred embodiment of my invention.

DETAILED DESCRIPTION

Referring now to FIG. 1A, therein is shown display device viewing screen 40 upon which a radial display trace normally originates from point 41 at the center of the screen in a manner well known in the art, and the trace is caused to rotate about point 41 in synchronism with the rotation of a radar antenna (not shown). The intensity of the radial trace is modulated to display radar targets in a well-known manner. By the use of off-center position controls (not shown), which may be in the form of potentiometers, digital thumb-wheel controls or computer control, the trace origin may be moved to any other point on screen 40, other than point 41, or the trace origin may be moved anywhere off screen, such as to point 42, as is known in the art.

To best understand my invention, one must understand how target displays with off-center operation are accomplished in the prior art. Accordingly, the operation of radar equipment in the off-center mode is first briefly described.

Figure 2:
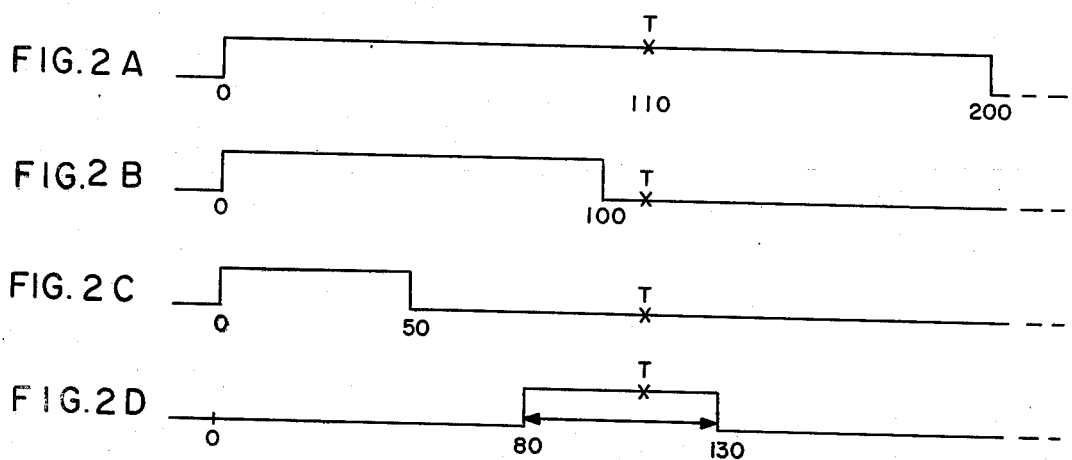
FIGS. 2C–2D are a pictorial representation of radar range gates and ramp deflection signals in prior art radar equipment and in equipment utilizing my novel equipment.

A radar transmitter usually transmits pulses at a fixed repetition rate which determines the maximum range of operation of the radar equipment. When shorter range settings are selected by the operator pulses are still transmitted at the fixed rate but radar pulses reflected from targets are received and displayed on the whole of viewing screen 40 by using different radial trace deflection signals and by using range gates that are open for shorter periods of time. Reflected pulses received within the shorter time period are displayed while others are not. Representations of range gate periods are shown in FIG. 2. In the prior art range gates were opened when a radar pulse was transmitted as shown in FIGS. 2A, 2B and 2C. FIG. 2A shows a range gate open for 200 mile range operation with a target T being at 110 miles range. By changing the range switch to a 100 mile or a 50 mile setting as shown in FIGS. 2B and 2C, range gates are utilized that are open for shorter periods of time and pulses reflected from target T are not received. It should be noted that the change of the range scale switch from 200 mile range to either the 100 mile or 50 mile range caused target T to be "lost" off the screen. By the use of the off-center controls, however, the radar operator can relocate target T by moving the range gate "window" as repesented in FIG. 2D to receive the reflected pulse. Even though a target may be relocated using the off-center controls there are many radar applications such as air traffic control where even short loss of target display is unacceptable.

As mentioned briefly in the last paragraph, the radial trace ramp deflection signal applied to the cathode ray tube indicator is changed when the range control is changed. The ramp deflection signal for a shorter range has a steeper slope than that for a longer range and causes the radial trace to move from point 41 to the edge of screen 40 at a faster rate. FIG. 3A shows a ramp deflection signal for 200 mile range operation while FIGS. 3B and 3C, respectively, show steeper sloped ramp deflection signal for 100 mile and 50 mile range operation. When the range switch is set for 50 mile range operation the radial trace beam will sweep from point 41 to the edge of screen 40 in one-fourth the time required for 200 mile range operation. This, as is well known in the art, effectively expands or "blows-up" the display to fill screen 40. As a result, targets within the selected shorter range are magnified and produce a larger target trace on screen 40. Conversely, changing range settings of the radar from a shorter range to a longer range effectively contracts the size of display targets.

Figure 4:
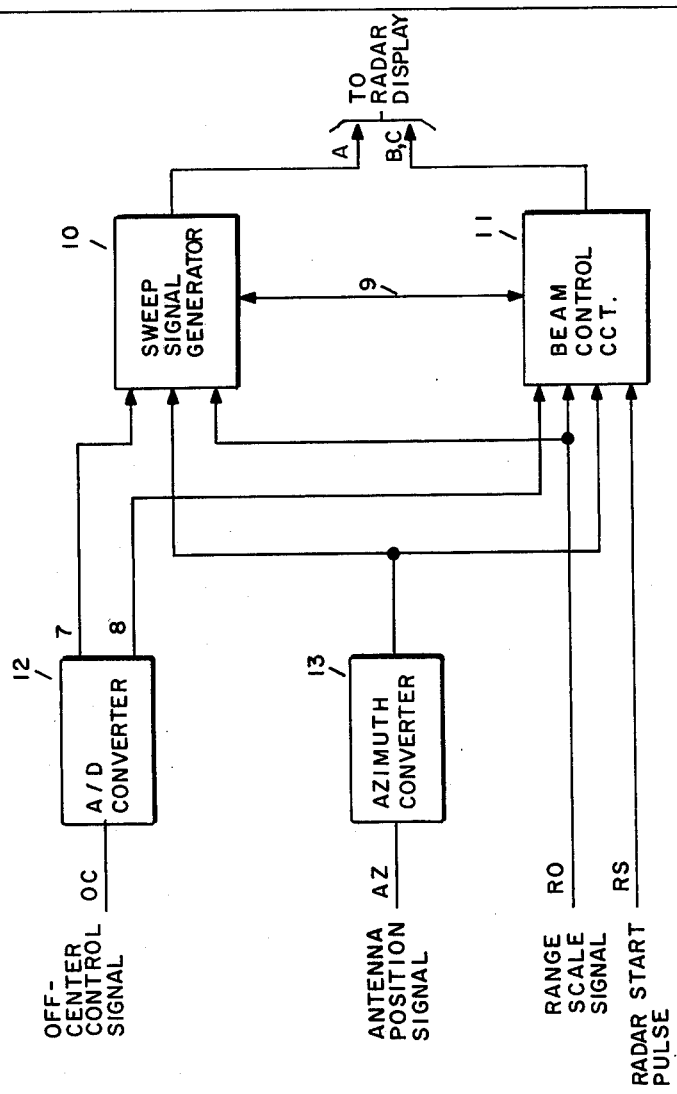
FIG. 4 shows a simplified functional block diagram of my novel apparatus.

Turning now to the simplified functional block diagram of my invention shown in FIG. 4, therein is shown the two basic elements of my invention; sweep signal generator 10 that generates deflection signals controlling the traces on the display device and beam control circuit 11 used to move displays on display device 40. As my off-center radar display circuit operates digitally, all inputs thereto must be in digital format. In this embodiment of my invention some input signals are in digital form and some signals are in analog form and must be converted to digital form. In the art input signals to my novel off-center radar display circuit from the radar equipment are normally available in digital form. The offset control signal is obtained from potentiometers (not shown) via lead OC- and is in analog form. Analog to digital converter 12 is utilized to convert the analog offset control signal to digital form before the signal is applied to generator 10 and control circuit 11. In the event thumb-wheel off-center controls are utilized no converter is needed as these controls directly provide a digital output.

Similarly, generator 10 and control circuit 11 require the analog antenna position signal on lead AZ to be connected to digital form so azimuth converter 13 is utilized. In the event that the antenna position signal is already in digital format, converter 13 is not required.

In this embodiment of my invention the range scale signal and radar start pulse are already in digital format and an analog to digital converter is not required.

In this embodiment of my invention the range scale signal and radar start pulse are already in digital format and an analog to digital converter is not required.

As mentioned previously, a radial trace origin can be effectively moved off-screen by manipulating the off-center controls. In actuality the electron beam in the display tube (not shown) is driven off the screen and strikes the aquadag coating on the inside walls of the tube. In addition, the further off screen the trace origin is effectively moved the amplifiers introduce more and more distortion. This is a problem which is unacceptable in the prior art.

By the use of my invention the electron beam of the display CRT is never driven off screen 40 of FIG. 1A. When the off-center controls are manipulated by the radar operator to move the radial trace origin off display screen 40 to point 42 the beam is moved to the edge of screen 40 and is blanked. The display my novel equipment creates, however, appears to be radial traces originating from and rotating about point 42 in synchronization with the radar antenna. Such rotating traces are represented by traces 43, 44, 45 and 46. There is a display on screen 40 only when the radial traces originating from trace origin point 42 are rotated past screen 40 as represented by traces 44 and 45. As a result of this method of operation powerful deflection amplifiers are not required in radar equipment having my off-center radar display circuit and positional distortion due to overdriving amplifiers is eliminated.

With my novel equipment the position of the off-screen, off-center radial trace origin is calculated from the off-center control, range scale control, antenna position, and radar start pulse signals in digital form input to sweep signal generator 10 and beam control circuit 11 in FIG. 4. Generator 10 and control circuit 11 then cooperate to determine the time it would take a radial trace to travel from point 42 to a point on the edge of screen 40, such as point 47 for trace 44, and then the blanked beam is moved to point 47, unblanked and moved across screen 40 to point 48 to display that portion of trace 44 that appears on screen 40. Once the beam reaches point 48, it is again blanked and awaits movement to another point such as point 49 to display the appropriate portion of trace 45. During the time the radial trace completes a 360° sweep around point 42, radial traces such as traces 46 and 43 are not displayed and the beam remains blanked at the edge of screen 40.

More particularly, the beam of the display tube is positioned at one corner of screen 40 when it is blanked. Referring to FIG. 1B, the blanked beam is positioned at point 51 at the lower left corner of display 40. The beam remains blanked during the period that radial trace 44 can be considered as moving from trace origin point 42 to point 47. When the beam would have moved along trace 44 to point 65 where its vertical displacement is represented by vector D1, the vertical ramp deflection signal is started and the beam is moved from point 51 to point 47 where it is unblanked at the moment when the beam would have moved along trace 44 to point 47. The time for the vertical displacement to point 65 is referred to as time period T1 and the time to complete vertical displacement to point 47 is referred to as time period T2 further in this specification. At this time, the horizontal ramp deflection signal is started and the beam traces the line segment from point 47 to point 48 where the beam is stopped and blanked. The blanked beam is then returned to point 51. For each successive radial trace the same procedure is repeated except that different points along the edge of screen 40 are used. Radar targets that would be displayed on screen 40 by radial traces, such as trace 44, would intensity modulate the radial trace segments displayed on screen 40.

Returning to FIG. 4, beam control circuit 11 is responsive to the off-center control signal output on lead 8, the antenna position signal output from converter 13, the range scale signal on lead R0 and the radar start pulse on lead RS to calculate the time it would take radial trace 44 to travel from trace origin point 42 to radial trace intersection points along the edge of screen 40 such as points 47 and 48 in FIG. 1. The result of this calculation is forwarded via a lead 9 to sweep signal generator 10 which is also responsive to the off-center control, antenna position, and range scale signals to generate ramp deflection voltages of the right slope, right velocity, and starting at the right time to properly deflect the display tube electron beam across screen 40. The ramp deflection signals are output on leads A to the radar display deflection circuitry. Beam control circuit 11 outputs a signal on lead BC indicating to the display circuitry when to blank and unblank the display beam to properly display the radial trace segments appearing on screen 40.

Turn now to FIG. 5 which shows a detailed block diagram of sweep signal generator 10, and FIG. 6 which shows a detailed block diagram of beam control circuit 11. These two figures should be arranged as shown in FIG. 7 for the following description. In FIG. 5 the range scale signal present on lead R0 in digital format is input to sweep range compensator 15 in generator 10 and is also applied via lead R0 to FIG. 6 where it is input to calculator 24 in beam control circuit 11. An off-center control (not shown) provides an analog off-center control signal made up of two parts. The first part, present on lead OCX, indicates the magnitude of displacement of the radar trace origin in the X horizontal direction. The portion of the signal present on lead OCY indicates the magnitude of displacement of the radar trace origin in the vertical direction. As previously mentioned, input signals that are in analog form must be converted to digital form and the off-center control signal in analog form is converted to digital form by A/D converter 12. After conversion to digital form, both the horizontal (X) and vertical (Y) components of the off-center control signal are multi-bit digital words; the first bit of each word indicating the direction of the off-center radial trace origin point 42 of FIGS. 1A or 1B with respect to point 41. The basic four quadrants of a circle measured counter clockwise from a horizontal or X axis are used for this purpose. Point 42 falls in the third quadrant (180° to 270°) about point 41 so both the X and Y component of the off-center control signal have a negative sign. Therefore, the first bit of the multi-bit digital words representing the X and Y components of the off-center control signal are both 0 representing the negative value. In the first quadrant the X and Y components would both be positive; in the second quadrant the X component is negative and the Y component is positive; and in the fourth quadrant the X component is positive and the Y component is negative. The first bit of the digital word representing the X component of the off-center control signal is present on lead DX and is applied to quadrant detector 14 in generator 10. Similarly, the first bit of the digital word representing the Y component of the off-center control signal is output from converter 12 on lead DY and is also input to quadrant detector 14. The remaining bits of the multi-bit digital words representing the X and Y components of the off-center control signal indicate the magnitude of the off-set. These bits of the two multi-bit digital words are output from converter 12 on leads MAGX and MAGY and are applied to calculator 24 of control circuit 11.

The antenna position signal is also input in analog form in this embodiment of my invention and is present on lead AZ. Azimuth converter 13 converts this analog antenna position signal into two multi-bit digital words representing the sine and cosine function of the angular antenna position. The first bit of the sine and cosine multi-bit digital words indicate whether the sine or cosine function is negative or positive. In FIG. 1A radial traces 43, 44 and 45 are all between 0° and 90° of the antenna rotation and the sine and cosine functions of their angles are both positive. Therefore, the first bit of the appropriate multi-bit digital words output from converter 13 are each 1 indicating the positive sine and cosine function. The first bit of both the sine and cosine words are output from converter 13 on leads SS and CS, respectively, and are input to two circuits; quadrant detector 14 via leads CS and SS, and calculator 24 in control circuit 11. The remaining bits of the sine and cosine digital words output from converter 13 indicate the magnitude of the sine and cosine function. These magnitude bits are input respectively to multplying digital to analog converters 18 and 19 and are applied via leads CM and SM to calculator 24. The only other input from conventional radar circuitry to my novel equipment is seen in FIG. 6. It is the radar start pulse present on lead RS and is input to range counter 25 indicating the moment that the radar transmitter (not shown) transmits a radar pulse.

Generator 10 must first determine whether the horizontal and vertical ramp deflection signals should have a positive or negative slope. In the example shown in FIG. 1B, the beam travels from left to right and from bottom to top representing positive slope horizontal and vertical ramp deflection signals. If, however, trace origin point 42 were above and to the right of screen 40, the beam would travel from right to left and from top to bottom across the screen representing negative slope horizontal and vertical ramp deflection signals. Quadrant detector 14 of generator 10 determines whether the slope of the ramp deflection signals are to be positive or negative. As previously described, azimuth converter 13 converts analog antenna position signals into multi-bit digital words, the first bit of each of which indicate the one of four azimuth quadrants of 90° each that the radar antenna is sweeping. These first bits are input to quadrant detector 14 via leads CS and SS. Also, as previously described, the first bits of the multi-bit digital words output from converter 12 indicate whether the off-center radial trace origin 42 is above, below, to the left, or to the right of screen 40 as shown in FIG. 1B. The first bits of the digital off-center control signal words are input to quadrant detector 14 via leads DX and DY. From the first bits of the digital azimuth position and off-center control words, quadrant detector 14 determines whether the horizontal and vertical ramp deflection signals should have positive or negative slopes. Detector 14 provides an appropriate output on leads 55 and 56 that are input to ramp generator 17 and 16 respectively that cause the ramp deflection signals to be modified by conditioning generators 16 and 17 to generate positive or negative slope signals.

Ramp generators 16 and 17 also have three other inputs. The second input to both is via lead 57 from sweep range compensator 15. It should be noted that the input to sweep range compensator 15 is the range scale signal present on lead R0. As previously described, when a range scale control of a radar set is set on successively shorter ranges, radial traces on screen 40 sweep from the trace origin to the edge of the screen at successively faster speeds. In the off-center mode of operation the radial trace segments displayed on screen 40 must also sweep across screen 40 at a rate corresponding to the range scale setting of the radar equipment. The rate of change of the radial trace deflection signals generated by ramp generators 16 and 17 is determined by the input from compensator 15.

The third input to ramp generators 16 and 17 is input via leads TXE and TYE from FIG. 6. The function of the signals on leads TXE and TYE are now described but their generation will be described further in the specification when beam control circuit 11 is described in detail. The signals on leads TXE and TYE cause the ramp generators to generate the ramp deflection signals at the proper point in time and in the proper sequence. That is, the ramp deflection signals each must be started at the right moment in time in order to properly display segments of the radial traces on screen 40 as previously described.

The fourth input to ramp generators 16 and 17 is via lead BL from FIG. 6 and the generation of the signal on this lead is described further in the specification. The signal on lead BL indicates when a radial trace has traveled across screen 40 to an edge thereof and causes ramp generators 16 and 17 to turn off thereby terminating the ramp deflection signals output therefrom.

The ramp deflection signals output from ramp generators 16 and 17 appear on leads 58 and 59 respectively and are input to multiplying digital to analog converters 18 and 19, respectively. As can be seen, the other input to multiplying digital to analog (D/A) converters 18 and 19 are the output leads CM and SM from azimuth converter 13. The digital signals on leads CM and SM are the magnitude of the sine and cosine function of the antenna position signal as previously described. Multiplying D/A converters 18 and 19 respond to the cosine and sine magnitude words input respectively thereto to modify the slope of the ramp deflection signals input thereto from ramp generator 16 and 17 in order that the ramp deflection signals input to the deflection amplifiers of the display CRT (not shown) will have the proper slopes to properly display segments of the radial traces appearing on screen 40.

The ramp deflection signals output from D/A converters 18 and 19 are each applied via one of resistors R1 and R2 to one of the two inputs of operational amplifiers 20 and 21, respectively. The other input to amplifiers 20 and 21 is from quadrant detector 14. The signals input to amplifiers 20 and 21 via resistors R3 and R4 from detector 14 are dc potentials indicating the maximum off-set of the display system. More particularly, when the off-center controls are manipulated by the radar operator the off-center trace origin point 42 in FIG. 1B is off-set to the third quadrant about point 41. The dc potentials input to operational amplifiers 20 and 21 causes the beam to be positioned at point 51 when radial trace segments are not being traced on screen 40. When point 42 is in the second quadrant above and to the left of point 41, the dc potentials input to amplifiers 20 and 21 from quadrant detector 14 cause the beam to position at point 62 between tracing of radial trace segments on screen 40. Similarly, if point 42 is in the first quadrant, the beam will be positioned at point 63, and if point 42 is in the fourth quadrant, the beam will be positioned at point 64.

The ramp deflection signals modified by operational amplifiers 20 and 21 are amplified by amplifiers 22 and 23 respectively and output on leads DX and DY to be applied to the deflection amplifiers (not shown) of the radar display CRT. The ramp deflection signals output from operational amplifiers 20 and 21 are also applied via leads YS and XS to comparators 28 and 29 in FIG. 6 causing blanking of the display beam as is discussed further in the specification.

Turning now to FIG. 6 to describe in detail the operation of beam control circuit 11. The circuitry in beam control circuit 11 accomplishes two basic functions; the first of these is basically to make appropriate calculations in response to the various inputs from the radar circuitry and provide outputs for controlling sweep signal generator 10 in the generation of ramp deflection signals. The other function accomplished by beam control circuit 11 is to provide signals to the video amplifier (not shown) of the display CRT to blank and unblank the electron beam thereof.

Calculator 24 in beam control circuit 11 is responsive to a number of inputs to perform calculations required to determine the time of generation of the ramp deflection signals by sweep signal generator 10. As described heretofore calculator 24 has digital input signals on leads SM and CM from azimuth converter 13 indicating the magnitude of the sine and cosine function of the position of the radar antenna with respect to a reference azimuth. Inputs to calculator 24 on leads SS and CS from azimuth converter 13 indicate whether the cosine and sine functions are negative or positive. The input to calculator 24 on lead R01 is the range scale signal. Finally, the input to calculator 24 on leads MAGX and MAGY from analog to digital converter 12 in FIG. 5 are the magnitude of the horizontal and vertical component of the off-set of the off-center radial trace origin. In this embodiment of my invention calculator 24 consists of commercially available integrated circuits which are programmed to perform the calculations required for my novel off-center radar circuit.

There is an output from calculator 24 on lead 60 and 61. The output on lead 60 is a control signal indicative of the horizontal time component it takes a radial trace to travel from trace origin point 42 in FIG. 1B to travel to the edge of screen 40, while the output on lead 61 is a control signal indicative of the vertical time component.

The signals on leads 60 and 61 are input respectively to comparators 26 and 27 which cooperate with calculator 24 to generate signals for controlling the ramp generators in FIG. 5. Comparators 26 and 27 each have a second input from range counter 25 which in turn has the radar start pulse on lead RS as its input. Range counter 25 consists of a digital counter that starts its counting in response to a radar start pulse. Once range counter 25 starts counting the pulses of an internal clock the count in the counter is output on lead 66 and applied to comparators 26 and 27. Comparators 26 and 27 compare the digital count with the output from calculator 24 on leads 60 and 61 indicative of the time that the horizontal and vertical ramp deflection signals should be generated by sweep signal generator 10. When comparators 26 and 27 determine that the output on leads 60 and 61 match the content of range counter 25 the comparators output trigger signals onto leads TXE and TYE respectively. The trigger signals output from comparators 26 and 27 indicate the exact moment the horizontal ramp deflection signal and the vertical ramp deflection signal should start. Accordingly, these ramp deflection start trigger signals on leads TXE and TYE are input to X ramp generator 16 and Y ramp generator 17 respectively in sweep signal generator 10 to start the generation of the ramp deflection signals.

The ramp deflection start trigger signals present on leads TXE and TYE are also input to logic AND gate 31 of radial trace display blanking apparatus in beam control circuit 11. Referring briefly to FIG. 1B, we previously described how the period was timed during which a radial trace travels from trace origin point 42 to point 65. At the end of this period, referred to as time T1 heretofore, generation of the vertical ramp deflection signal is started causing the blanked display beam to travel from point 51 to point 47. When the blanked beam reaches point 47, at the end of time T2 as discussed heretofore, comparator 26 provides an output that causes generation of the horizontal ramp deflection signal. With both deflection signals applied to the display tube the beam traces the trace segment between points 47 and 48 on screen 40. The beam must also be unblanked during this time as is now described. As AND gate 31 must have both its inputs high before it can provide an output, ramp deflection signal start signals must be present on both leads TXE and TYE in order for there to be an output from gate 31. This occurs when the beam reaches point 47 as just described. Then there is an output from AND gate 31 which energizes the set input S of flip-flop 32 causing the flip-flop to change from its 0 state to its 1 state. Flip-flop 32 being in its 1 state energizes lead BC to the video amplifier (not shown) of the display system causing the beam of the display to be unblanked. This is the exact moment that the radial trace reached point 47 in FIG. 1B and the unblanked beam travels from point 47 to point 48 as previously described. Flip-flop 32 remains in its set state with its 1 output energized until a signal is applied to its reset input R as is now described.

As mentioned previously with reference to FIG. 1B, the beam must be blanked after it reaches point 48. OR gate 30 is used to accomplish this purpose by changing flip-flop 32 back to its 0 state to deenergize lead BC and thereby cause the beam of the display tube to be blanked. As can be seen in FIG. 6 there are three inputs to OR gate 30. There is one input from each of comparators 28 and 29, which are described immediately hereinafter, and the third input is from range counter 25. Range counter 25 25 is allowed to count in response to its internal clock after being started by a radar start pulse until the counter reaches a count corresponding to the maximum range of the radar equipment. At this time range counter 25 energizes lead 67 causing an output from OR gate 30 in a well known manner. The output from OR gate 30 resets flip-flop 32 to its reset state thereby deenergizing lead BC causing blanking of the display beam.

Comparators 28 and 29 each have two inputs and, as mentioned previously, their outputs are connected to OR gate 30 for blanking the display beam. The purpose of comparators 28 and 29 is to blank the display beam when the beam reaches an edge of screen 40 in FIG. 1B. Comparator 28 has a potential V1 at one of its two inputs and comparator 29 has a potential V2 at one of its two inputs. Potential V1 is equal to the ramp deflection signal potential required to displace the display beam to the right hand edge of screen 40. similarly, potential V2 is equal to the vertical ramp deflection signal potential required to displace the beam to the top edge of screen 40. As the second input of both comparators 28 and 29 are respectively the horizontal deflection signal output from operational amplifier 20 and the vertical ramp deflection ramp signal output from operational amplifier 21, comparators 28 and 29 each provide an output once the ramp deflection signal potentials equal the corresponding ones of potentials V1 and V2. In this manner the display beam is blanked whenever the beam is deflected to one edge of screen 40.

Figure 3:
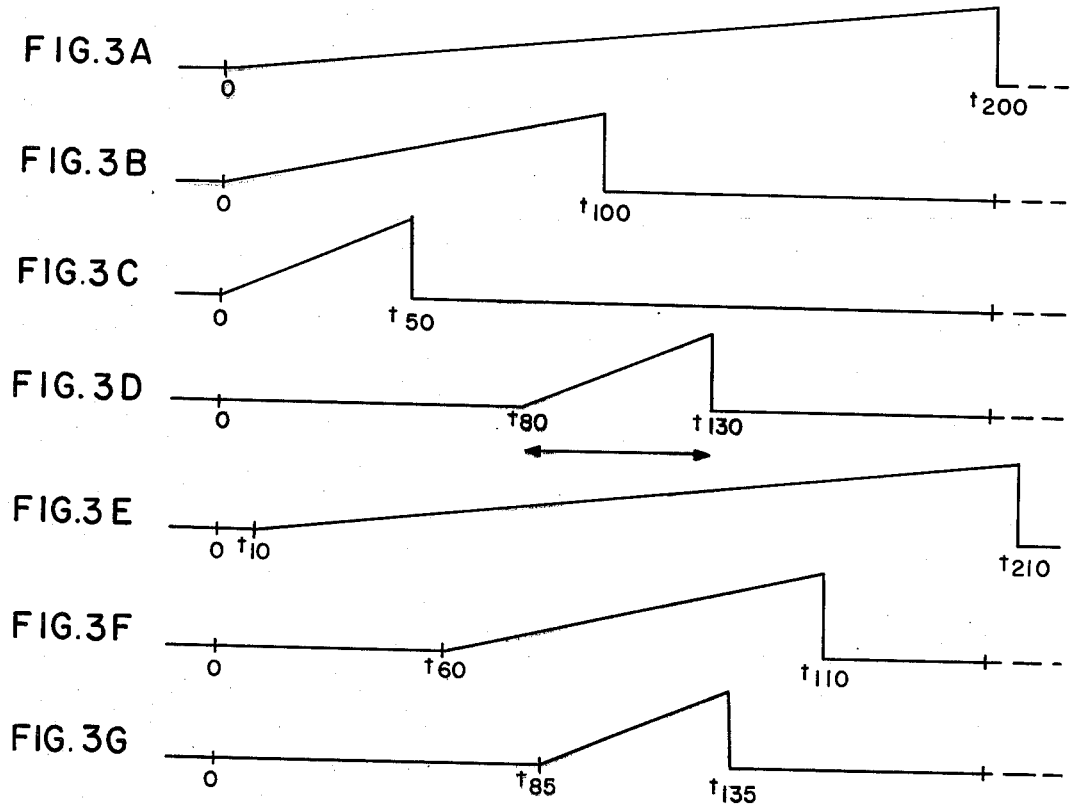
FIGS. 3A–3G are a pictorial representation of the ramp sweep signals for radial traces in prior art radar equipment and in equipment utilizing my off-center apparatus.

Now that the operation of my novel off-center radar display circuit has been described in detail, its function when the range scale is changed by the radar operator is discussed in reference to FIGS. 2 and 3. In the prior art, off-center controls could shift the operational point of a range gate, as shown in FIG. 2D, in order to display a target that was shifted off the display screen when the range scale switch was changed to a shorter range as described heretofore. The temporary loss of display of a target or area is unacceptable. Once the off-center controls are used to relocate a target changing the range scale switch to an even shorter range can result in losing display of the target again and the off-center controls must again be used to relocate the target. For example, referring to FIG. 2D, the range gate represented there is for 50 mile range operation between 80 and 130 miles and the target is displayed at 110 miles range. If the range scale is changed to 20 miles range, the gate will open at 80 miles range and close at 100 miles range and display of the target is lost a second time. This occurs because range gates and, correspondingly, ramp deflection signals are generally started at a fixed time interval from the beginning of a radar pulse for any given setting of the off-center controls. My novel circuitry solves this problem. Calculator 24 in beam control circuit 11 is responsive to each change of the range scale switch by the operator to change the time, with respect to the beginning of each radar start pulse, that the ramp deflection signals are started. The effect is to keep whatever is displayed at the center of screen 40 centered thereat when the range scale switch is changed. To accomplish this calculator 24 causes the start pulses output from comparators 26 and 27 to be shifted in time starting generation of each of the ramp deflection signals as to keep displays centered on screen 40. More particularly, calculator 24 solves two equations for each radial trace and generates the previously described outputs from the calculator on leads 60 and 61 which determine when the horizontal and vertical ramp deflection signals are generated. These equations are:

$$t_y = k(y_o - r_o)/\sin\theta \quad t_x = k(x_o - r_o)/\cos\theta$$

In these equations, $t_x$ is the signal output on lead 60 to start the horizontal ramp deflection signal while $t_y$ is the signal output on lead 61 to start the vertical ramp deflection signal. The constant $k$ in the equations designates the time it takes a radar signal to travel a unit distance. Referring to FIG. 1B, $\theta$ is the angle of a radial trace with respect to the horizontal which is also antenna azimuth 90°, $x_o$ is the distance from point 41 to the 0° azimuth line and reflects the degree of off-set. $y_o$ is the distance from point 41 to the 90° azimuth line and also reflects the degree of offset. Finally, $r_o$ is the range setting of the radar equipment.

In analyzing the two equations hereinabove, it can be seen that a change in the range scale setting to a shorter range will make the numerators of the equations become larger which makes the values of $t_x$ and $t_y$ larger. This delays generation of the horizontal and vertical deflection signals such as seen in FIGS. 3E, 3F, and 3G for 200 mile, 100 mile and 50 mile range settings respectively with a 10 mile off-set. The effect is that whatever is displayed at the center of screen 40 in FIGS. 1A and 1B at one range setting will be displayed thereat after a change of range to a shorter or longer range setting.

Although a preferred embodiment of my invention has been described herein in considerable detail for illustrative purposes, many modifications will occur to those skilled in the art without deviating from the scope of my invention as defined in the appended claims.

What I claim is:

1. In a display system having a display device upon which information is displayed using display traces emanating from a first point thereon, a trace origin control used for indicating a second point from which said display traces should emanate, and means responsive to said trace origin control indications for moving the display of information on said device causing said display traces to emanate from said second point comprising
    means responsive to said trace origin control indications for generating first control signals and including display blanking means responsive to second control signals to control said display device to blank or unblank said display traces, and
    trace control means responsive to said first control signals for generating second signals causing said display device to move said display traces to emanate from said second point.

2. The invention in accordance with claim 1 wherein said trace control means further comprises modifier means responsive to other indications from said display system for changing said second signals for display of said traces emanating from said second point.

3. In combination, a display system having a display device upon which radial traces emanating from a first point are used to display information input to said system, a trace origin control used to move the information displayed on said device, means for generating start signals that are shifted in time responsive to the setting of said trace origin control, a trace signal generator responsive to said start signals for generating trace signals that are applied to said display device to trace only those segments of said radial traces that appear on said device, the operation of said trace origin control moving said displayed information by causing said radial traces to emanate from a second point the position of which is determined by setting of said trace origin control and may be on or off said display device, and blanking means responsive to said start signals and said trace signals to blank or unblank said display device to display only said trace segments appearing on said device.

4. The invention in accordance with claim 3 wherein said start signals comprise a first and a second trigger signal that can start at different times, and said trace signals comprise a first and a second trace signal that are generated by said signal generator means in response to said first and said second trigger signals, respectively.

5. The invention in accordance with claim 3 wherein said information is received during a first time period and wherein said trace signals generated by said trace signal generating means have a duration equal to a second time period, said second time period being selectively equal to or shorter than said first time period, the setting of said traced origin control determining when during said first time period said trace signals commence by causing said start signals to be shifted with respect to the beginning of said first time period, and said start signal generating means is responsive to any duration of said second time period to shift said start signals so that information displayed at a specified point of said display device before a change in said second time period will be displayed at said specified point after said change in said second time period.

6. In a display system having a display device upon which radial traces emanating from a first point are used to display information, with said system being responsive to a plurality of input signals to control said radial traces to display said information, a trace origin control used to move the information displayed on said device, and means responsive to said trace origin control to move said information displayed on said device by causing said radial traces to emanate from a second point comprising
    means for generating a first and a second trace signal that are used to control said radial traces in a first and a second direction, respectively,
    control means responsive to said plurality of input signals and to said trace origin control to generate a first and second start signal used to control said trace signal generating means and
    trace blanking means responsive to said first and said second start signals and to said first and second trace signals to unblank said display device when said radial traces are being displayed on said device and to blank said display device when said radial traces displayed thereon reach the edge of said device.

7. The invention in accordance with claim 6 further comprising first modifier means responsive to a first one of said plurality of input signals to shape said first and said second trace signals for display of said information on said device, and second modifier means responsive to said first one and a second one of said plurality of input signals to generate polarity control signals that are input to said trace signal generating means to determine the polarity of said first and second trace signals generated thereby.

8. The invention in accordance with claim 7 wherein said control means comprises calculator means responsive to said plurality of input signals to generate control signals.
    counter means started in response to another signal input to said display system, and
    first comparator means that are jointly responsive to the count contents of said counter means and to said control signals to generate said first and second start signals.

9. The invention in accordance with claim 8 wherein said trace blanking means comprises first logic means responsive to said first and second start signals to unblank said display device to display said information, and second comparator means jointly responsive to said first and second trace signals and to a first and a second potential to blank said display device when a radial trace displayed thereon reaches the edge of said device.

* * * * *